United States Patent
Sarlioglu et al.

(10) Patent No.: US 10,020,717 B2
(45) Date of Patent: Jul. 10, 2018

(54) DUAL STATOR, FLUX SWITCHING PERMANENT MAGNET MACHINE

(71) Applicant: Wisconsin Alumni Research Foundation, Madison, WI (US)

(72) Inventors: Bulent Sarlioglu, Madison, WI (US); Yingjie Li, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 981 days.

(21) Appl. No.: 14/458,781

(22) Filed: Aug. 13, 2014

(65) Prior Publication Data

US 2016/0049853 A1    Feb. 18, 2016

(51) Int. Cl.
| H02K 1/14 | (2006.01) |
|---|---|
| H02K 1/17 | (2006.01) |
| H02K 1/24 | (2006.01) |
| H02K 19/10 | (2006.01) |
| H02K 21/44 | (2006.01) |
| H02K 3/28 | (2006.01) |
| H02K 16/00 | (2006.01) |

(52) U.S. Cl.
CPC ............. H02K 19/103 (2013.01); H02K 3/28 (2013.01); H02K 16/00 (2013.01); H02K 21/44 (2013.01)

(58) Field of Classification Search
CPC ...... H02K 19/103; H02K 19/10; H02K 16/00; H02K 31/28; H02K 21/44; H02K 21/38
USPC ................. 310/46, 112, 114, 49.46, 181, 166
See application file for complete search history.

(56) References Cited

U.S. PATENT DOCUMENTS

| 1,408,555 A | * | 3/1922 | Wood ..................... | H02K 37/04 |
|---|---|---|---|---|
| | | | | 310/216.083 |
| 3,984,711 A | * | 10/1976 | Kordik .................. | H02K 37/20 |
| | | | | 310/154.07 |
| 4,899,072 A | * | 2/1990 | Ohta ..................... | H02K 37/18 |
| | | | | 310/114 |

(Continued)

FOREIGN PATENT DOCUMENTS

| EP | 0421655 | * | 8/1993 |
|---|---|---|---|
| GB | 2428903 | * | 2/2007 |
| GB | 2468695 | * | 9/2010 |

OTHER PUBLICATIONS

IEEE Transactions on Energy Conversion, vol. 23, No. 3, Sep. 2008.*

(Continued)

*Primary Examiner* — Bernard Rojas
*Assistant Examiner* — Ahmed Elnakib
(74) *Attorney, Agent, or Firm* — Bell & Manning, LLC

(57) ABSTRACT

An electric machine includes a rotor, a first stator, and a second stator. The rotor includes a rotor core and a first and a second plurality of poles mounted to extend radially from the rotor core. The first stator and the second stator each include a stator core, a plurality of teeth mounted to extend from the stator core, and a plurality of permanent magnets mounted as first spokes within the plurality of teeth. The stators are mounted radially relative to a first side of the rotor and separated by a first air gap between the plurality of poles and the plurality of teeth. At least four windings are connected in series and wound about the plurality of teeth. A first flux linkage in a first pair of series connected windings is a mirror image of a second flux linkage in a second pair of series connected windings.

18 Claims, 12 Drawing Sheets

(56) References Cited

U.S. PATENT DOCUMENTS

| | | | |
|---|---|---|---|
| 5,168,190 A * | 12/1992 | Bahn | H02K 16/00 310/106 |
| 5,652,493 A * | 7/1997 | Hendershot, Jr. | H02K 19/103 318/400.17 |
| 5,691,583 A * | 11/1997 | Suzuki | H02K 3/525 310/164 |
| 5,925,965 A | 7/1999 | Li et al. | |
| 6,242,834 B1 * | 6/2001 | Akemakou | H02K 19/24 310/162 |
| 7,034,422 B2 | 4/2006 | Ramu | |
| 8,138,652 B2 * | 3/2012 | Davis | H02K 11/048 310/114 |
| 2007/0018520 A1 | 1/2007 | Kaneko et al. | |
| 2007/0046124 A1 | 3/2007 | Aydin et al. | |
| 2009/0091198 A1 * | 4/2009 | Husband | H02K 21/44 310/46 |
| 2009/0243422 A1 | 10/2009 | Atarashi et al. | |
| 2010/0038978 A1 * | 2/2010 | Hoang | C23C 4/04 310/46 |
| 2010/0072832 A1 * | 3/2010 | Zhu | H02K 21/44 310/49.46 |
| 2010/0231079 A1 | 9/2010 | Abe et al. | |
| 2010/0295389 A1 | 11/2010 | Tessier et al. | |
| 2011/0070108 A1 * | 3/2011 | Arita | H02K 9/06 417/410.1 |
| 2013/0113318 A1 | 5/2013 | Nishiyama | |
| 2013/0249324 A1 | 9/2013 | Gandhi et al. | |
| 2014/0049124 A1 | 2/2014 | Gandhi et al. | |
| 2014/0062267 A1 | 3/2014 | Pollock et al. | |

OTHER PUBLICATIONS

IEEE Transactions on Magnetics, vol. 46, No. 6, Jun. 2010.*
IEEE Transactions on Magnetics, vol. 45, No. 10, Oct. 2009.*
IEEE Transactions on Magnetics, vol. 52, No. 8, Aug. 2016.*
Wang et al., Preliminary study on a 3D field permanent magnet flux switching machine—from tubular to rotary configurations, Journal of International Conference on Electrical Machines and Systems, vol. 1, No. 4, Dec. 2012, pp. 505-508.
Z.Q. Zhu, Novel Switched Flux Permanent Magnet Machine Topologies, Transactions of China Electrotechnical Society, vol. 27, No. 7, Jul. 2012, pp. 1-16.
Zhang et al., Analysis of a novel hybrid-excitation flux-switching brushless machine, Downloaded from http://intermag2014.ifw-dresden.de/index.php?id=32&no_cache=1&pd=960 on Jul. 17, 2014, pp. 1-2.
Somesan et al., Design of a Permanent Magnet Flux-Switching Machine, IEEE, May 21, 2012, pp. 256-259.

* cited by examiner

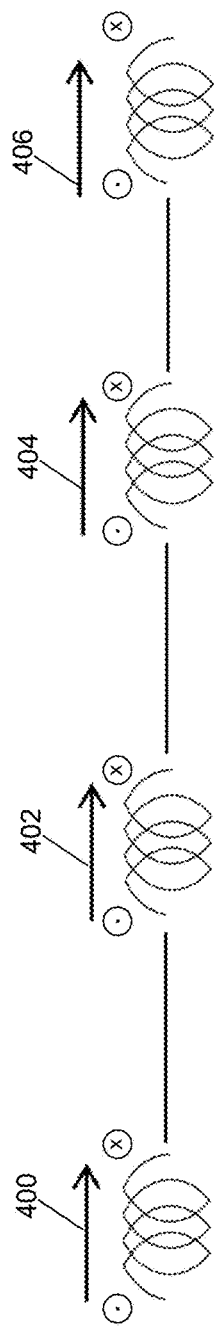
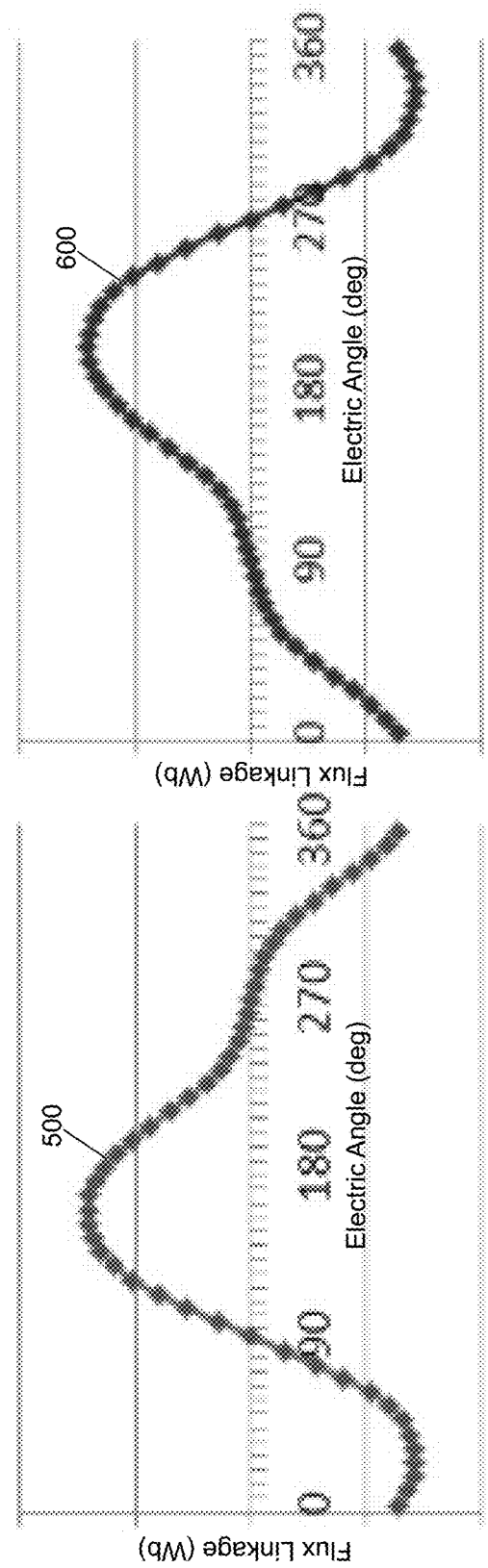
Fig. 4
Fig. 5
Fig. 6

DUAL STATOR, FLUX SWITCHING PERMANENT MAGNET MACHINE

BACKGROUND

The excitation frequency, f, of a flux switching permanent magnet (FSPM) machine is proportional to the number of rotor poles ($N_r$), $$f_e = \frac{nN_r}{60},$$

and not pole pairs, where n is the rotational speed in revolutions per minute (rpm). A typical FSPM machine has 12 stator slots and 10 rotor poles resulting in a high fundamental excitation frequency when operated at high-speed. For some high speeds, the fundamental frequency may not be attainable with today's power electronic converters.

To reduce the fundamental frequency for a given rotational speed, the number of rotor poles should be as small as possible. The minimum number of stator slots is six for a three-phase machine since it should be an even number and also a multiple of three. The number of rotor poles can be 4, 5, 7, 8, etc. Not all of these combinations are suitable for practical use, because of issues such as unbalanced back-electromotive force (EMF) and unbalanced rotor force.

SUMMARY

In an example embodiment, an electric machine includes, but is not limited to, a rotor, a first stator, a second stator, and a first stator winding, a second stator winding, a third stator winding, and a fourth stator winding connected in series. The rotor includes, but is not limited to, a rotor core, a first plurality of poles and a second plurality of poles. The rotor core forms a cylinder having a circular cross section. The first plurality of poles is mounted to extend radially from the circular cross section of the rotor core and along a surface of the rotor core. The second plurality of poles is mounted to extend radially from the circular cross section of the rotor core and laterally along the surface of the cylinder of the rotor core. The first plurality of poles and the second plurality of poles do not overlap radially in a plane of the circular cross section of the rotor core. The first stator includes, but is not limited to, a first stator core, a first plurality of teeth mounted to extend from the first stator core to form a first plurality of slots, and a first plurality of permanent magnets mounted as first spokes within the first plurality of teeth. A slot of the first plurality of slots is positioned between a pair of the first plurality of teeth. The first stator is mounted radially relative to a first side of the rotor separated by a first air gap between the first plurality of poles and the first plurality of teeth. The second stator includes, but is not limited to, a second stator core, a second plurality of teeth mounted to extend from the second stator core to form a second plurality of slots, and a second plurality of permanent magnets mounted as second spokes within the second plurality of teeth. A slot of the second plurality of slots is positioned between a pair of the second plurality of teeth. The second stator is mounted radially relative to the first side of the rotor separated by a second air gap between the second plurality of poles and the second plurality of teeth. The first stator winding for a first phase is wound about a first tooth of the first plurality of teeth. The second stator winding for the first phase is wound about a second tooth of the first plurality of teeth. The third stator winding for the first phase is wound about a first tooth of the second plurality of teeth. The fourth stator winding for the first phase is wound about a second tooth of the second plurality of teeth. A first flux linkage in a first pair of the series connected windings is a mirror image of a second flux linkage in a second pair of the series connected windings. The second pair of the series connected windings is connected in series with the first pair of the series connected windings.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 4 depicts a series winding connectivity diagram between windings of the first stator of FIG. 2 and the second stator of FIG. 3 in accordance with an illustrative embodiment.

FIG. 5 depicts a flux linkage in a first pair of the series connected windings of FIG. 4 in accordance with an illustrative embodiment.

FIG. 6 depicts a flux linkage in a second pair of the series connected windings of FIG. 4 in accordance with an illustrative embodiment.

DETAILED DESCRIPTION

Figure 1:
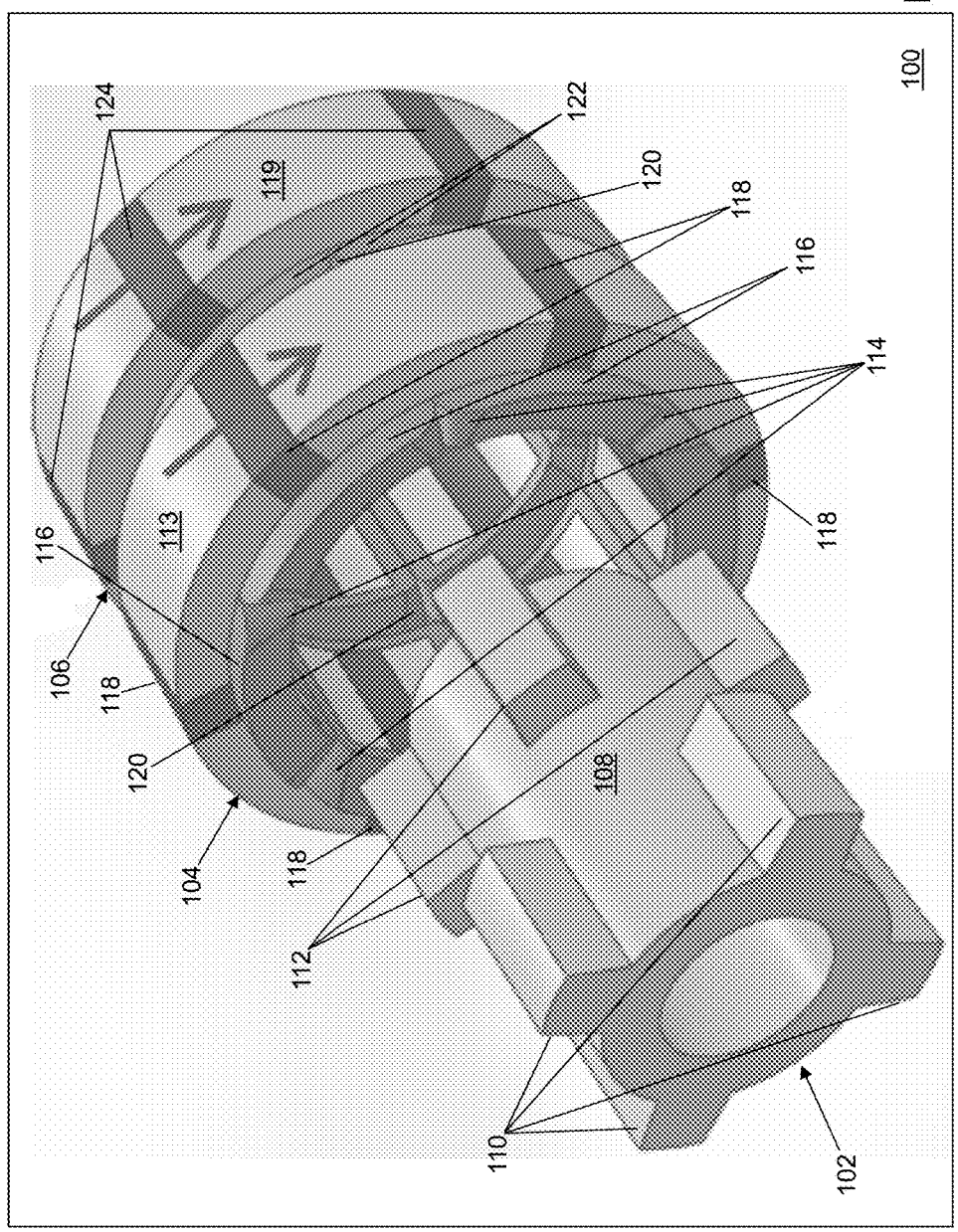
FIG. 1 depicts a perspective view of a flux switching permanent magnet machine (FSPM) in accordance with an illustrative embodiment.

Referring to FIG. 1, a front perspective view of a flux switching permanent magnet machine (FSPM) 100 is shown in accordance with an illustrative embodiment. FSPM 100 may include a rotor 102, a first stator 104, and a second stator 106. In the illustrative embodiment, FSPM 100 is a three-phase machine that can be configured as a generator or as a motor as understood by a person of skill in the art. In alternative embodiments, FSPM 100 can be configured to support a fewer or a greater number of phases.

Rotor 102 is mounted to a shaft for rotation as understood by a person of skill in the art. Rotor 102 may be formed of a ferromagnetic material such as lamination steel, iron, cobalt, nickel, etc. as understood by a person of skill in the art. Rotor 102 may include a rotor core 108, a first plurality of poles 110, and a second plurality of poles 112. Rotor core 108 forms a cylinder having a circular cross section. The first plurality of poles 110 are mounted to extend radially outward from the circular cross section of rotor core 108 and axially along a surface of the cylinder of rotor core 108. The second plurality of poles 112 also are mounted to extend radially outward from the circular cross section of rotor core 108 and axially along the surface of the cylinder of rotor core 108, such that the first plurality of poles 110 and the second plurality of poles 112 do not overlap radially in a plane of the circular cross section of rotor core 108. The first plurality of poles 110 is distributed evenly around rotor core 108, and the second plurality of poles 112 is distributed evenly around rotor core 108. As understood by a person of skill in the art, rotor core 108, the first plurality of poles 110, and the second plurality of poles 112 are laminations stacked in an axial direction. Laminations may be punched or laser cut.

As used in this disclosure, the term "mount" further includes join, unite, connect, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact, but are mounted together via intermediate elements). Elements referenced as mounted to each other herein may further be integrally formed together, for example, using a molding process as understood by a person of skill in the art. As a result, elements described herein as being mounted to each other need not be discrete structural elements. The elements may be mounted permanently, removably, or releasably A number of rotor poles, $N_{r1}$, of the first plurality of poles 110 equals a number of rotor poles, $N_{r2}$, of the second plurality of poles 112. In the illustrative embodiment, $N_{r1}=N_{r2}=4$, though other number of rotor poles are possible. The first plurality of poles 110 and the second plurality of poles 112 form rectangular boxes. As understood by a person of skill in the art, the cross-section of the first plurality of poles 110 and the second plurality of poles 112 in plane with the circular cross section of rotor core 108 may be approximately square or rectangular with straight or sloped sides that extend from the surface of rotor core 108.

In the illustrative embodiment of FIG. 1, first stator 104 has a generally circular cross section with a hollow core sized to accommodate rotor 102. First stator 104 may include a first stator core 113, a first plurality of teeth 116, and a first plurality of permanent magnets 118. The first plurality of teeth 116 extend radially from first stator core 113 forming a first plurality of slots 114. A slot of the first plurality of slots 114 is positioned between a pair of the first plurality of teeth 116. The first plurality of permanent magnets 118 are mounted as first spokes within the first plurality of teeth 116 that extend from first stator core 113.

In the illustrative embodiment of FIG. 1, second stator 106 has a generally circular cross section with a hollow core sized to accommodate rotor 102. Second stator 106 may include a second stator core 119, a second plurality of teeth 122, and a second plurality of permanent magnets 124. The second plurality of teeth 122 extend radially from second stator core 119 forming a second plurality of slots 120. A slot of the second plurality of slots 120 is positioned between a pair of the second plurality of teeth 122. The second plurality of permanent magnets 124 are mounted as second spokes within the second plurality of teeth 122 that extend from second stator 106.

As understood by a person of skill in the art, first stator core 113 and second stator core 119 are laminations stacked in an axial direction. Laminations may be punched or laser cut. First stator core 113 and second stator core 119 may be formed of a ferromagnetic material such as lamination steel, iron, cobalt, nickel, etc. First stator 104 and second stator 106 are positioned axially adjacent to each other with a gap between them. First stator 104 and second stator 106 are axially aligned such that the first plurality of permanent magnets 118 and the second plurality of permanent magnets 124 are positioned at the same angles relative to the centers of first stator 104 and second stator 106, respectively. A number of stator slots, $N_{s1}$, of the first plurality of slots 114 equals a number of stator slots, $N_{s2}$, of the second plurality of slots 120. In the illustrative embodiment, $N_{s1}=N_{s2}=6$, though other number of stator slots are possible.

Figure 2:
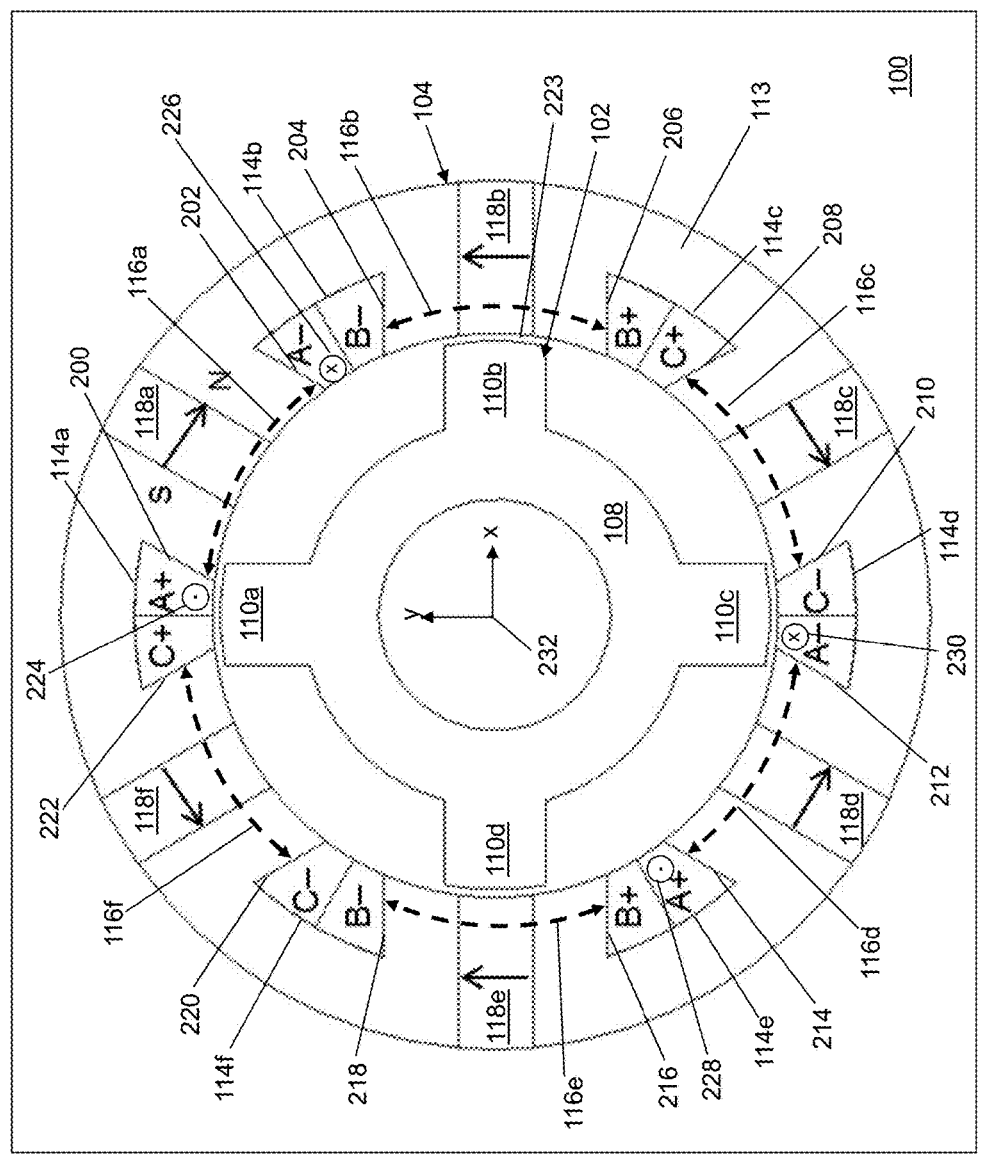
FIG. 2 depicts a front view of a first stator of the FSPM of FIG. 1 in accordance with an illustrative embodiment.

Referring to FIG. 2, a front cross-sectional view of FSPM 100 is shown in accordance with an illustrative embodiment. First stator 104 is mounted radially relative to a first side of rotor 102 separated by a first air gap 223 between the first plurality of poles 110 and the first plurality of teeth 116. The first plurality of teeth 116 extend inwards from first stator core 113 towards the first plurality of poles 110. The first plurality of poles 110 extend outward from an outer surface of rotor core 108 towards an inner surface of the first plurality of teeth 116 when rotor 102 is mounted within first stator 104. In an alternative embodiment, first stator 104 may be mounted within rotor 102 such that the first plurality of poles 110 extend inward from an inner surface of rotor core 108, and the first plurality of teeth 116 extend outwards from first stator core 113.

The first plurality of poles 110 may include a first pole 110a, a second pole 110b, a third pole 110c, and a fourth pole 110d mounted to extend from rotor core 108 at equal angles. For example, relative to x-y axes 232, first pole 110a is positioned at 90 degrees, second pole 110b is positioned at 0 degrees, third pole 110c is positioned at −90 degrees, and fourth pole 110d is positioned at 180 degrees.

The first plurality of slots 114 may include a first slot 114a, a second slot 114b, a third slot 114c, a fourth slot 114d, a fifth slot 114e, and a sixth slot 114f. The first plurality of teeth 116 may include a first tooth 116a, a second tooth 116b, a third tooth 116c, a fourth tooth 116d, a fifth tooth 116e, and a sixth tooth 116f. First slot 114a is mounted between sixth tooth 116f and first tooth 116a. Second slot 114b is mounted between first tooth 116a and second tooth 116b. Third slot 114c is mounted between second tooth 116b and third tooth 116c. Fourth slot 114d is mounted between third tooth 116c and fourth tooth 116d. Fifth slot 114e is mounted between fourth tooth 116d and fifth tooth 116e. Sixth slot 114f is mounted between fifth tooth 116e and sixth tooth 116f.

First slot 114a, second slot 114b, third slot 114c, fourth slot 114d, fifth slot 114e, and sixth slot 114f are mounted to first stator core 113 at equal angles. For example, relative to x-y axes 232, first slot 114a is positioned at 90 degrees, second slot 114b is positioned at 30 degrees, third slot 114c is positioned at −30 degrees, fourth slot 114d is positioned at −90 degrees, fifth slot 114e is positioned at −150 degrees, and sixth slot 114f is positioned at 150 degrees.

First tooth 116a is formed between a first slot, first side wall 200 and a second slot, first side wall 202. Second tooth 116b is formed between a second slot, second side wall 204 and a third slot, first side wall 206. Third tooth 116c is formed between a third slot, second side wall 208 and a fourth slot, first side wall 210. Fourth tooth 116d is formed between a fourth slot, second side wall 212 and a fifth slot, first side wall 214. Fifth tooth 116e is formed between a fifth slot, second side wall 216 and a sixth slot, first side wall 218. Sixth tooth 116f is formed between a sixth slot, second side wall 220 and a first slot, second side wall 222. The side walls 200-222 may be straight or sloped. A width between side walls 200-222 of the first plurality of teeth 116 may be relatively wider or narrower than that shown in FIG. 2.

The first plurality of permanent magnets 118 may include a first permanent magnet 118a, a second permanent magnet 118b, a third permanent magnet 118c, a fourth permanent magnet 118d, a fifth permanent magnet 118e, and a sixth permanent magnet 118f. First permanent magnet 118a is mounted within first tooth 116a between first slot 114a and second slot 114b. Second permanent magnet 118b is mounted within second tooth 116b between second slot 114b and third slot 114c. Third permanent magnet 118c is mounted within third tooth 116c between third slot 114c and fourth slot 114d. Fourth permanent magnet 118d is mounted within fourth tooth 116d between fourth slot 114d and fifth slot 114e. Fifth permanent magnet 118e is mounted within fifth tooth 116e between fifth slot 114e and sixth slot 114f. Sixth permanent magnet 118f is mounted within sixth tooth 116f between sixth slot 114f and first slot 114a.

First permanent magnet 118a, second permanent magnet 118b, third permanent magnet 118c, fourth permanent magnet 118d, fifth permanent magnet 118e, and sixth permanent magnet 118f are mounted within first stator core 113 at equal angles. For example, relative to x-y axes 232, first permanent magnet 118a is positioned at 60 degrees, second permanent magnet 118b is positioned at 0 degrees, third permanent magnet 118c is positioned at −60 degrees, fourth permanent magnet 118d is positioned at −120 degrees, fifth permanent magnet 118e is positioned at 180 degrees, and sixth permanent magnet 118f is positioned at 120 degrees.

The first plurality of permanent magnets 118 may have a generally rectangular box shape. The generally rectangular box shape of the first plurality of permanent magnets 118 may include curved faces, for example, on the sides facing rotor 102. The first plurality of permanent magnets 118 may be formed of rare earth magnets, such as neodymium and dysprosium, of ferrite based magnets, etc. The first plurality of permanent magnets 118 is electrically isolated from each other. Each permanent magnet of the plurality of permanent magnets 118 is magnetized to form a south (S) pole on a first side and a north (N) pole on a second side opposite the first side, wherein the magnetization direction is circumferential relative to first stator core 113. The first plurality of permanent magnets 118 are mounted with N poles adjacent N poles and S poles adjacent S poles to form pole pairs. For illustration, first permanent magnet 118a and second permanent magnet 118b form a first pole pair with the arrows pointing from the S pole to the N pole. The pole pairs are formed at a regular pitch circumferentially around first stator 104.

First windings are mounted in the first plurality of slots 114 of first stator 104 as understood by a person of skill in the art. In an illustrative embodiment, the windings are concentrated and tied together at a point. In the illustrative embodiment of FIG. 1, FSPM 100 includes three-phase windings that are tied together. Each phase of the three-phase windings further includes a positive winding and a negative winding on first stator 104. The positive winding may be defined such that when the winding is excited by a direction of current shown in FIG. 2, the flux generated by the excitation current goes from rotor 102 to first stator 104. The winding is regarded "negative" if the flux goes from first stator 104 to rotor 102.

For example, a first phase positive winding is wound about first slot, first side wall 200 and second slot, first side wall 202 of first tooth 116a. The first phase may be denoted as an A-phase. A first indicator 224 and a second indicator 226 indicate a current flow direction within the first phase positive winding. First indicator 224 indicates that a current flow is out of the page along first slot, first side wall 200, and second indicator 226 indicates that a current flow is into the page along second slot, first side wall 202. First indicator 224 may be associated with an A+ phase, and second indicator 226 may be associated with an A− phase. A first phase negative winding is wound about fourth slot, second side wall 212 and fifth slot, first side wall 214 of fourth tooth 116d. A third indicator 228 and a fourth indicator 230 indicate a current flow direction within the first phase negative winding. Third indicator 228 indicates that a current flow is out of the page along fifth slot, first side wall 214, and fourth indicator 230 indicates that a current flow is into the page along fourth slot, second side wall 212. Third indicator 228 may be associated with an A+ phase, and fourth indicator 230 may be associated with an A− phase.

Positive and negative phase windings for a second phase and a third phase (and for any additional phases) may be distributed circumferentially about first stator 104. For example, a second phase may be denoted as a B-phase, and a third phase may be denoted as a C-phase with windings distributed as shown with reference to FIG. 2.

Figure 3:
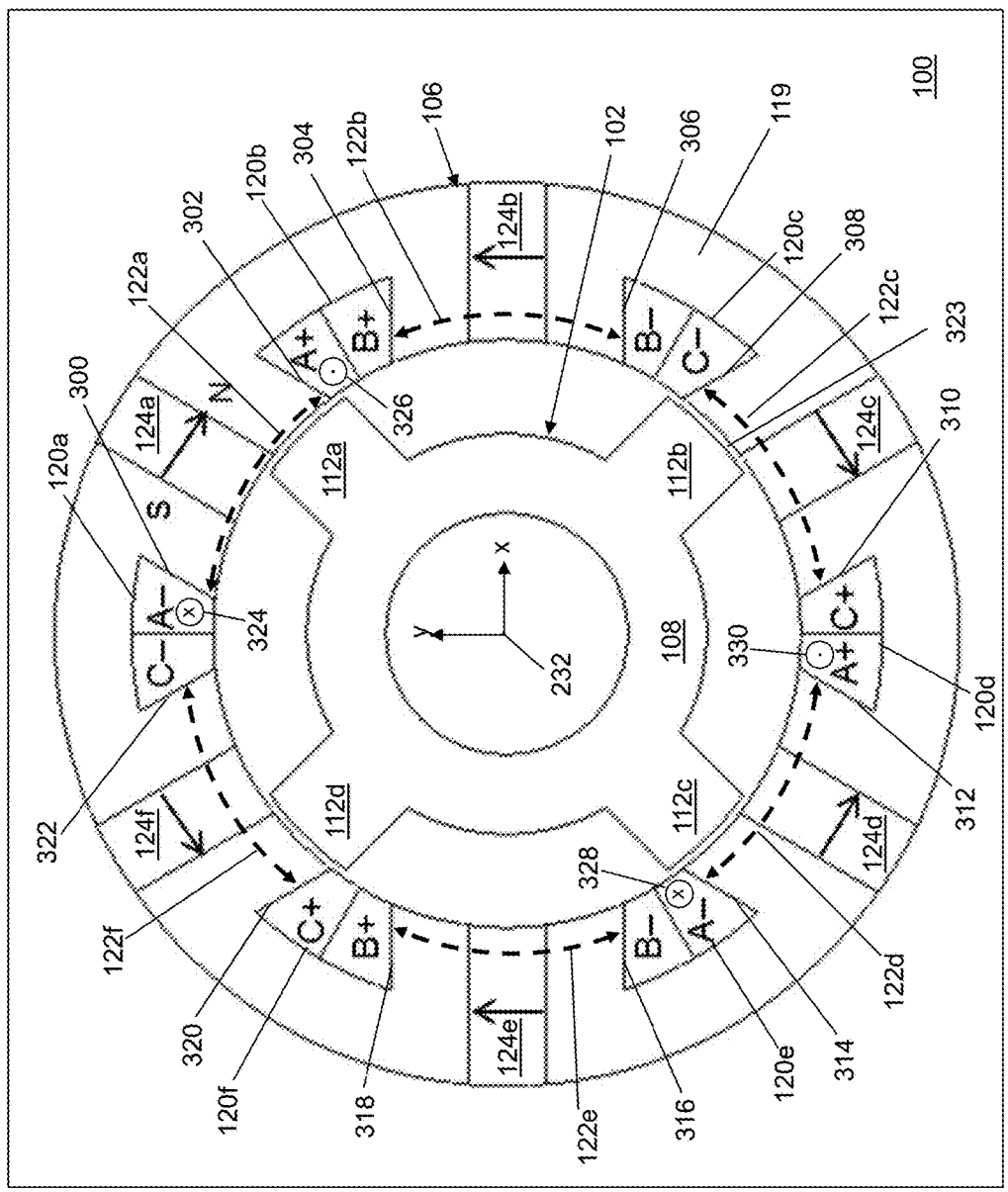
FIG. 3 depicts a front view of a second stator of the FSPM of FIG. 1 in accordance with an illustrative embodiment.

Referring to FIG. 3, a back cross-sectional view of FSPM 100 is shown in accordance with an illustrative embodiment. Second stator 106 is mounted radially relative to the first side of rotor 102 separated by a second air gap 323 between the second plurality of poles 112 and the second plurality of teeth 122. The second plurality of teeth 122 extend inwards from second stator core 119 towards the second plurality of poles 112. The second plurality of poles 112 extend outward from the outer surface of rotor core 108 towards the inner surface of the second plurality of teeth 122 when rotor 102 is mounted within second stator 106. In an alternative embodiment, second stator 106 may be mounted within rotor 102 such that the second plurality of poles 112 extend inward from the inner surface of rotor core 108, and the second plurality of teeth 122 extend outwards from second stator core 119.

The second plurality of poles 112 may include a first pole 112a, a second pole 112b, a third pole 112c, and a fourth pole 112d mounted to extend from rotor core 108 at equal angles. For example, relative to x-y axes 232, first pole 112a of the second plurality of poles 112 is positioned at 45 degrees, second pole 112b of the second plurality of poles 112 is positioned at −45 degrees, third pole 112c of the second plurality of poles 112 is positioned at −135 degrees, and fourth pole 112d of the second plurality of poles 112 is positioned at 135 degrees. In the illustrative embodiment of FIG. 1, the second plurality of poles 112 are rotated 45 degrees relative to the first plurality of poles 110.

The second plurality of slots 120 may include a first slot 120a, a second slot 120b, a third slot 120c, a fourth slot 120d, a fifth slot 120e, and a sixth slot 120f. The second plurality of teeth 122 may include a first tooth 122a, a second tooth 122b, a third tooth 122c, a fourth tooth 122d, a fifth tooth 122e, and a sixth tooth 122f. First slot 120a of the second plurality of slots 120 is mounted between sixth tooth 122f and first tooth 122a of the second plurality of teeth 122. Second slot 120b of the second plurality of slots 120 is mounted between first tooth 122a and second tooth 122b of the second plurality of teeth 122. Third slot 120c of the second plurality of slots 120 is mounted between second tooth 122b and third tooth 122c of the second plurality of teeth 122. Fourth slot 120d of the second plurality of slots 120 is mounted between third tooth 122c and fourth tooth 122d of the second plurality of teeth 122. Fifth slot 120e of the second plurality of slots 120 is mounted between fourth tooth 122d and fifth tooth 122e of the second plurality of teeth 122. Sixth slot 120f of the second plurality of slots 120 is mounted between fifth tooth 122e and sixth tooth 122f of the second plurality of teeth 122.

First slot 120a, second slot 120b, third slot 120c, fourth slot 120d, fifth slot 120e, and sixth slot 120f of the second plurality of slots 120 are mounted to second stator core 119 at equal angles. For example, relative to x-y axes 232, first slot 120a is positioned at 90 degrees, second slot 120b is positioned at 30 degrees, third slot 120c is positioned at −30 degrees, fourth slot 120d is positioned at −90 degrees, fifth slot 120e is positioned at −150 degrees, and sixth slot 120f is positioned at 150 degrees.

First tooth 122a is formed between a first slot, first side wall 300 and a second slot, first side wall 302 of second stator 106. Second tooth 122b is formed between a second slot, second side wall 304 and a third slot, first side wall 306 of second stator 106. Third tooth 122c is formed between a third slot, second side wall 308 and a fourth slot, first side wall 310 of second stator 106. Fourth tooth 122d is formed between a fourth slot, second side wall 312 and a fifth slot, first side wall 314 of second stator 106. Fifth tooth 122e is formed between a fifth slot, second side wall 316 and a sixth slot, first side wall 318 of second stator 106. Sixth tooth 122f is formed between a sixth slot, second side wall 320 and a first slot, second side wall 322 of second stator 106. The side walls 300-322 may be straight or sloped. A width between side walls 300-322 of the second plurality of teeth 122 may be relatively wider or narrower than that shown in FIG. 3.

The second plurality of permanent magnets 124 may have a generally rectangular box shape similar to the first plurality of permanent magnets 118. The second plurality of permanent magnets 124 may include a first permanent magnet 124a, a second permanent magnet 124b, a third permanent magnet 124c, a fourth permanent magnet 124d, a fifth permanent magnet 124e, and a sixth permanent magnet 124f. First permanent magnet 124a is mounted within first tooth 122a between first slot 120a and second slot 120b. Second permanent magnet 124b is mounted within second tooth 122b between second slot 120b and third slot 120c. Third permanent magnet 124c is mounted within third tooth 122c between third slot 120c and fourth slot 120d. Fourth permanent magnet 124d is mounted within fourth tooth 122d between fourth slot 120d and fifth slot 120e. Fifth permanent magnet 124e is mounted within fifth tooth 122e between fifth slot 120e and sixth slot 120f. Sixth permanent magnet 124f is mounted within sixth tooth 122f between sixth slot 120f and first slot 120a.

First permanent magnet 124a, second permanent magnet 124b, third permanent magnet 124c, fourth permanent magnet 124d, fifth permanent magnet 124e, and sixth permanent magnet 124f are mounted within first stator core 113 at equal angles. For example, relative to x-y axes 232, first permanent magnet 124a is positioned at 60 degrees, second permanent magnet 124b is positioned at 0 degrees, third permanent magnet 124c is positioned at −60 degrees, fourth permanent magnet 124d is positioned at −120 degrees, fifth permanent magnet 124e is positioned at 180 degrees, and sixth permanent magnet 124f is positioned at 120 degrees.

The second plurality of permanent magnets 124 may be formed of rare earth magnets, such as neodymium and dysprosium, of ferrite based magnets, etc. The second plurality of permanent magnets 124 is electrically isolated from each other. Each permanent magnet of the plurality of permanent magnets 124 is magnetized to form a south (S) pole on a first side and a north (N) pole on a second side opposite the first side, wherein the magnetization direction is circumferential relative to second stator core 119. The second plurality of permanent magnets 124 are mounted with N poles adjacent N poles and S poles adjacent S poles to form pole pairs. For illustration, first permanent magnet 124a and second permanent magnet 124b of the second plurality of permanent magnets 124 form a first pole pair with the arrows pointing from the S pole to the N pole. The pole pairs are formed at a regular pitch circumferentially around second stator 106.

Second windings are mounted in the second plurality of slots 120 of second stator 106 as understood by a person of skill in the art. In an illustrative embodiment, the windings are concentrated and tied together at a point. In the illustrative embodiment of FIG. 1, FSPM 100 includes three-phase windings that are tied together. Each phase of the three-phase windings further includes a positive winding and a negative winding on second stator 106. The positive winding may be defined such that when the winding is excited by a direction of current shown in FIG. 3, the flux generated by the excitation current goes from rotor 102 to second stator 106. The winding is regarded "negative" if the flux goes from second stator 106 to rotor 102.

For example, a first phase negative winding is wound about first slot, first side wall 300 and second slot, first side wall 302 of first tooth 116a of second stator 106. The first phase may be denoted as an A-phase. A fifth indicator 324 and a sixth indicator 326 indicate a current flow direction within the first phase negative winding of second stator 106. Fifth indicator 324 indicates that a current flow is into the page along first slot, first side wall 300 of second stator 106, and sixth indicator 326 indicates that a current flow is out of the page along second slot, first side wall 302 of second stator 106. Fifth indicator 324 may be associated with an A− phase, and sixth indicator 326 may be associated with an A+ phase. A first phase positive winding is wound about fourth slot, second side wall 312 and fifth slot, first side wall 314 of fourth tooth 122d of second stator 106. A seventh indicator 328 and an eighth indicator 330 indicate a current flow direction within the first phase positive winding of second stator 106. Seventh indicator 328 indicates that a current flow is into the page along fifth slot, first side wall 314 of second stator 106, and eighth indicator 330 indicates that a current flow is out of the page along fourth slot, second side wall 312 of second stator 106. Seventh indicator 328 may be associated with an A− phase, and eighth indicator 330 may be associated with an A+ phase.

A permanent magnet of the second plurality of permanent magnets 124 that is closest to a permanent magnet of the first plurality of permanent magnets 118 has the same magnetization direction relative to the closest permanent magnet of the first plurality of permanent magnets 118.

Positive and negative phase windings for a second phase and a third phase (and for any additional phases) may be distributed circumferentially about second stator 106. For example, a second phase may be denoted as a B-phase, and a third phase may be denoted as a C-phase with windings distributed as shown with reference to FIG. 3.

In an illustrative embodiment, the first windings of first stator 104 and the second windings of second stator 106 are tied together at a point. For example, with reference to FIG. 4, a first winding 400, a second winding 402, a third winding 404, and a fourth winding 406 are tied together. First winding 400 may be the first phase positive winding of first stator 104, second winding 402 may be the first phase negative winding of first stator 104, third winding 404 may be the first phase positive winding of second stator, and fourth winding 406 may be the 106 first phase negative winding of second stator 106. First winding 400, second winding 402, third winding 404, and fourth winding 406 are connected in series. Additional windings (not shown) may be similarly mounted in the first plurality of slots 114 of first stator 104 and the second plurality of slots 120 of second stator 106, may be connected in a similar manner, and joined in a "Y" configuration for any additional phases as understood by a person of skill in the art. The windings are wound about first stator 104 and about second stator 106 to form a number of poles between a set of terminals (not shown).

Referring to FIG. 5, a first flux linkage curve 500 is shown. First flux linkage curve 500 shows a flux linkage in the series connected first winding 400 and second winding 402 as a function of electrical angle. Referring to FIG. 6, a second flux linkage curve 600 is shown. Second flux linkage curve 600 shows a flux linkage in the series connected third winding 404 and fourth winding 406 as a function of electrical angle. Referring to FIGS. 5 and 6, first flux linkage curve 500 in the series connected first winding 400 and second winding 402 is a mirror image of second flux linkage curve 600 in the series connected third winding 404 and fourth winding 406. If the flux linkage produced by winding first winding 400 and second winding 402 is $\lambda_1(\theta)$, and the flux linkage produced by third winding 404 and fourth winding 406 is $\lambda_2(\theta)$, the relationship between the flux linkages is $\lambda_2(\theta)=\lambda_1(-\theta)$, where $0 \leq \theta < 360°$. As a result, the waveforms of $\lambda_1(\theta)$ and of $\lambda_2(\theta)$ are symmetrical about the y-axis (or $\theta=0$) axis, where $\theta$ is the rotor position in electric degrees.

Figure 7:
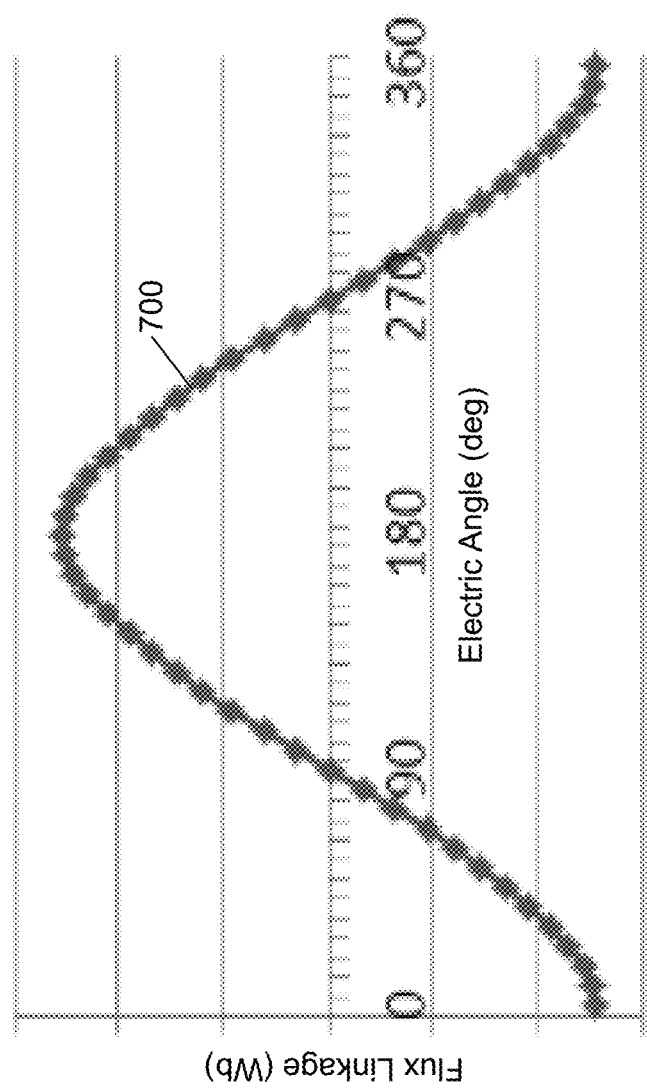
FIG. 7 depicts a total flux linkage in the series connected first and second pairs of series connected windings of FIG. 4 in accordance with an illustrative embodiment.

Referring to FIG. 7, a third flux linkage curve 700 is shown. Third flux linkage curve 700 shows a total flux linkage in the series connected first winding 400, second winding 402, third winding 404, and fourth winding 406. Third flux linkage curve 700 is approximately sinusoidal for the first phase.

Figure 8:
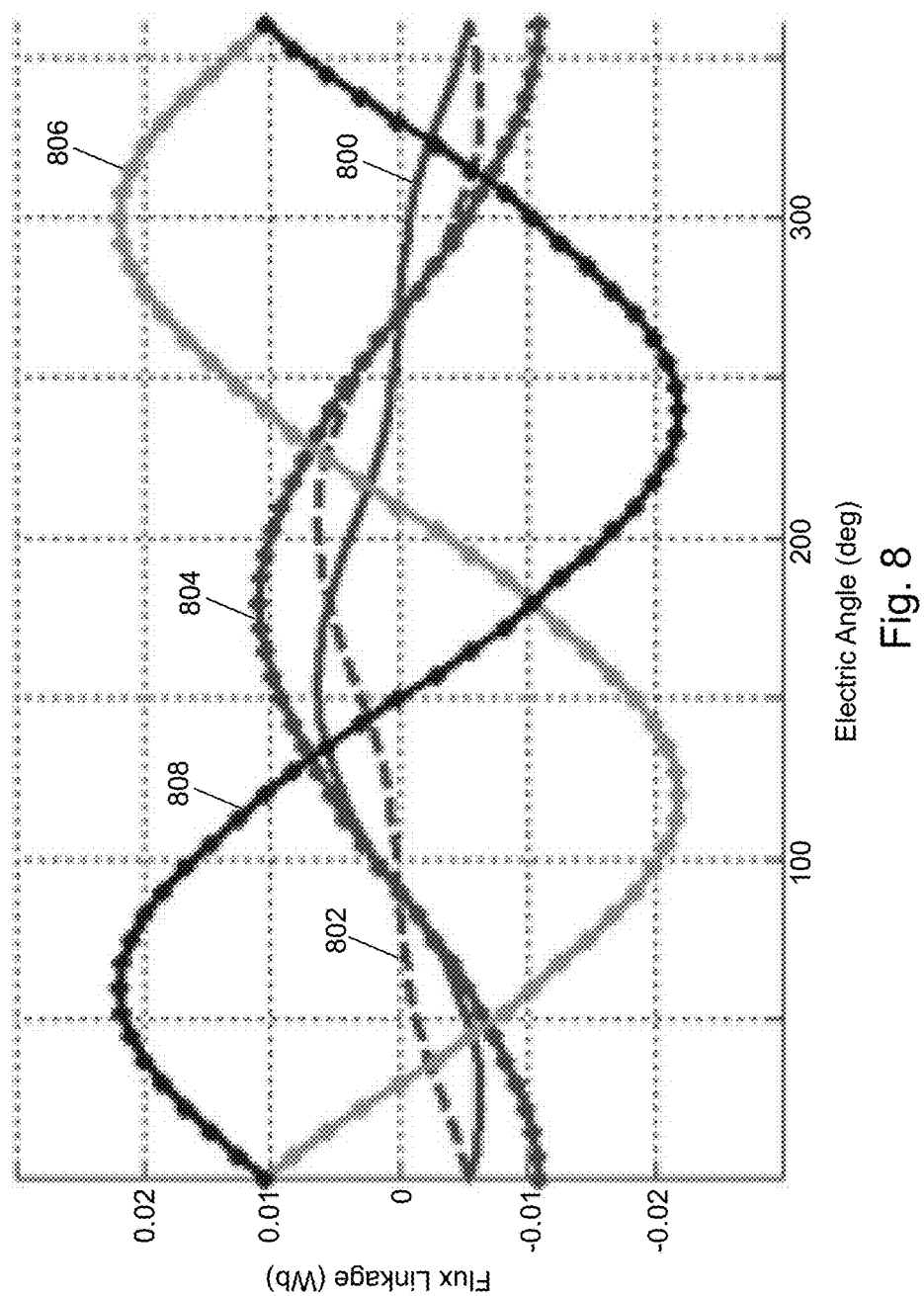
FIG. 8 depicts flux linkages in the series connected first and second pairs of series connected windings for multiple phases in accordance with an illustrative embodiment.

Referring to FIG. 8, a fourth flux linkage curve 800, a fifth flux linkage curve 802, a sixth flux linkage curve 804, a seventh flux linkage curve 806, and an eighth flux linkage curve 808 is shown to further illustrate the flux linkage distribution within the windings. Fourth flux linkage curve 800 shows a flux linkage in first winding 400 as a function of electrical angle. Fifth flux linkage curve 802 shows a flux linkage in third winding 404 as a function of electrical angle. Sixth flux linkage curve 804 shows a flux linkage in first winding 400 and third winding 404, or second winding 402 and fourth winding 406, as a function of electrical angle. The total flux linkage for additional phases is similarly approximately sinusoidal though shifted in angle. Seventh flux linkage curve 806 shows a total flux linkage as a function of electrical angle for the second phase, and eighth flux linkage curve 808 shows a total flux linkage for the third phase.

Figure 9:
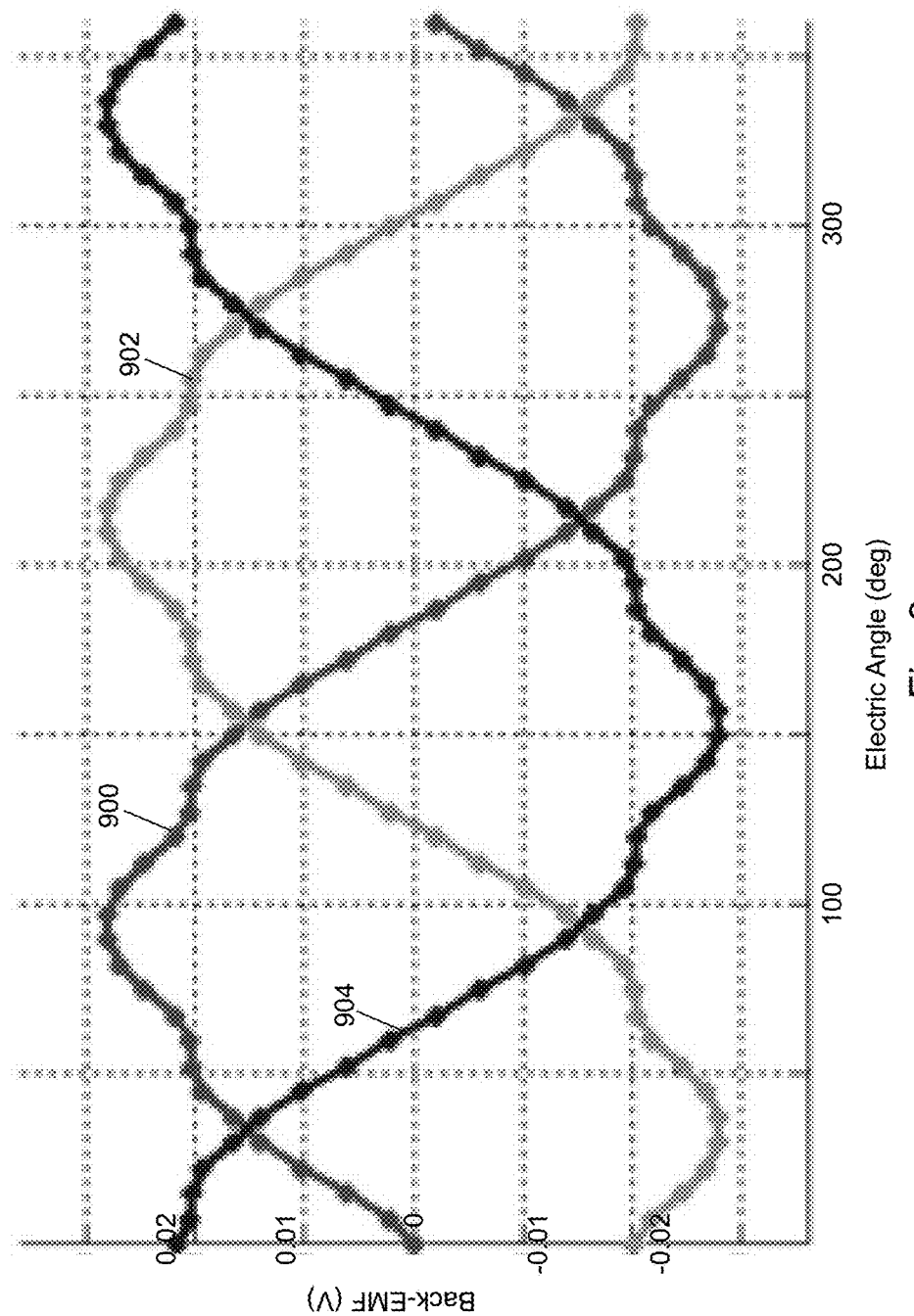
FIG. 9 depicts a back-electromotive force in the series connected first and second pairs of series connected windings for multiple phases in accordance with an illustrative embodiment.

Referring to FIG. 9, a first back-electromotive force (EMF) curve 900, a second back-EMF curve 902, and a third back-EMF curve 904. First back-EMF curve 900 shows a back-EMF in the first phase. Second back-EMF curve 902 shows a back-EMF in the second phase. Third back-EMF curve 904 shows a back-EMF in the third phase. First back-EMF curve 900, second back-EMF curve 902, and third back-EMF curve 904 are approximately sinusoidal with low order odd harmonics.

The various dimensions of the elements of rotor 102, first stator 104, and second stator 106, including first air gap 223 and second air gap 323, may be determined based on desired rated performance characteristics using analytical sizing equations and finite element analysis using an electromechanical design tool such as JMAG®-Designer developed by JSOL Corporation of Tokyo, Japan.

Figure 10:
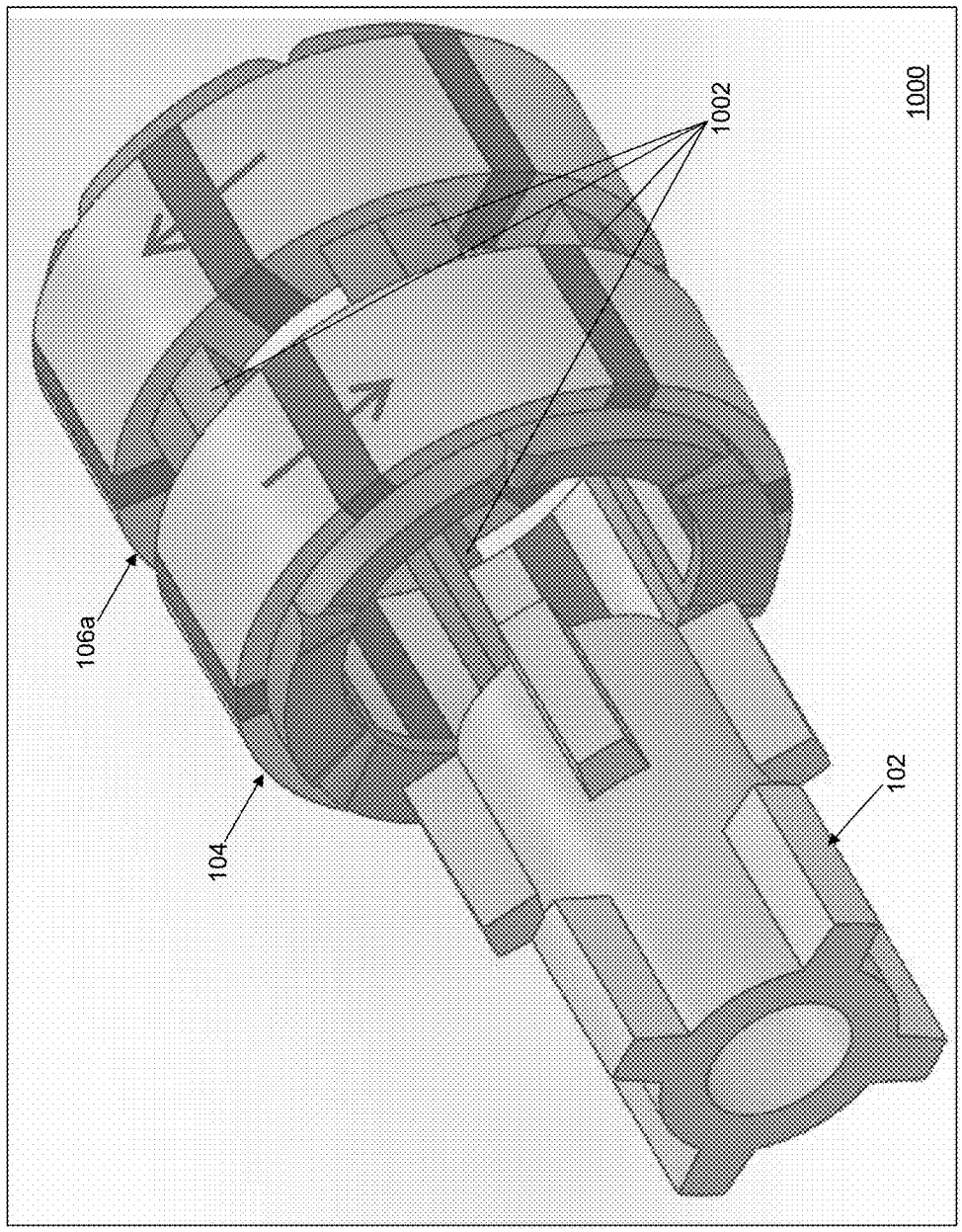
FIG. 10 depicts a perspective view of a second FSPM in accordance with an illustrative embodiment.

Referring to FIG. 10, a front perspective view of a second FSPM 1000 is shown in accordance with a second illustrative embodiment. Second FSPM 1000 may include rotor 102, first stator 104, and a third stator 106a. In the illustrative embodiment, second FSPM 1000 is a three-phase machine that can be configured as a generator or as a motor as understood by a person of skill in the art. In alternative embodiments, second FSPM 1000 can be configured to support one a fewer or a greater number of phases.

Figure 11:
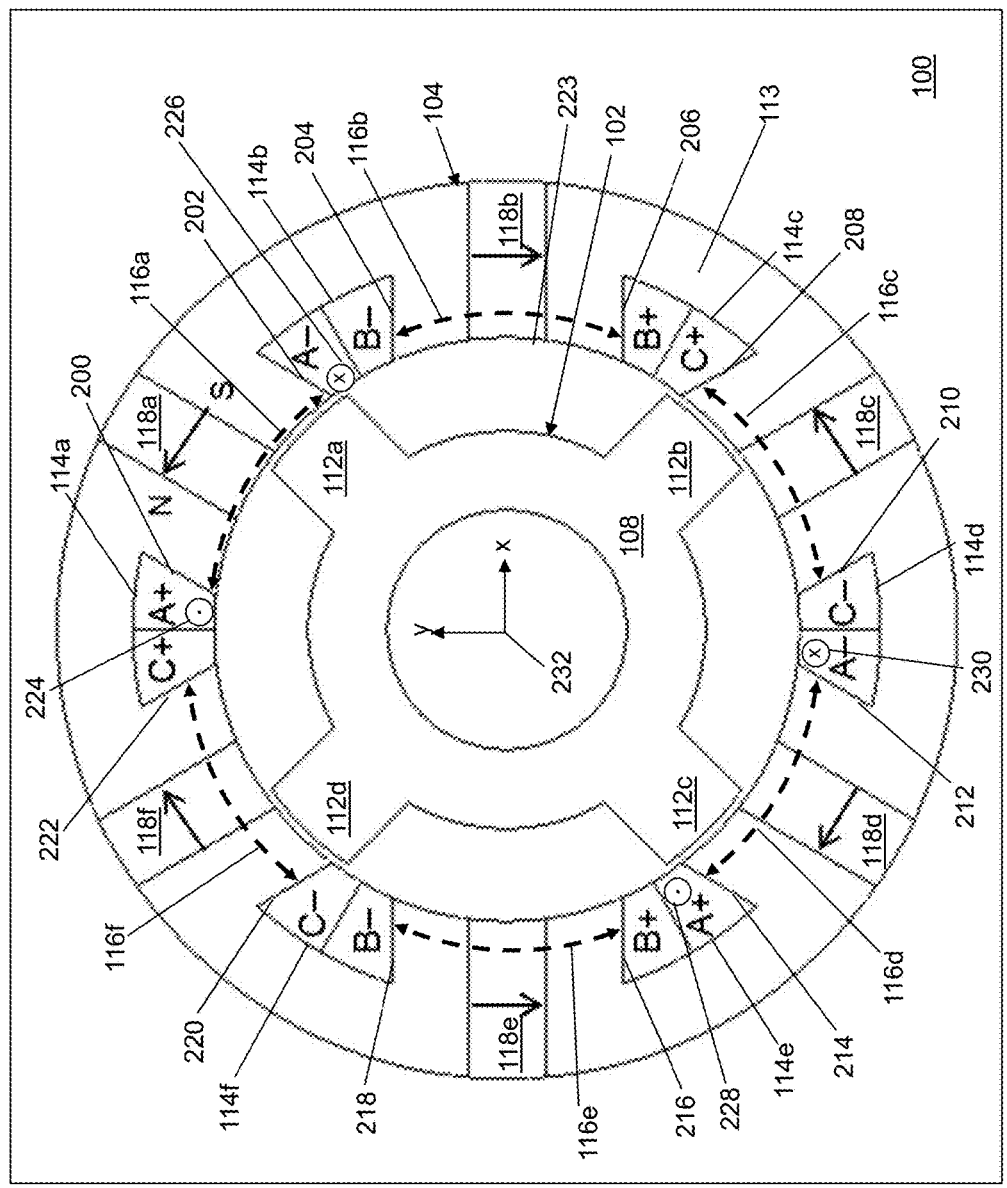
FIG. 11 depicts a front view of a second stator of the second FSPM of FIG. 10 in accordance with an illustrative embodiment.

Referring to FIG. 11, a back cross-sectional view of second FSPM 1000 is shown in accordance with an illustrative embodiment. In the illustrative embodiment of FIG. 11, third stator 106a may be identical to and axially aligned with first stator 104 except that a magnetization direction of each of the first plurality of permanent magnets 118 is reversed in third stator 106a. For example, first slot 114a of first stator 104 is axially aligned with first slot 114a of third stator 106a, second slot 114b of first stator 104 is axially aligned with second slot 114b of third stator 106a, and so on. First permanent magnet 118a of first stator 104 is axially aligned with first permanent magnet 118a of third stator 106a, but first permanent magnet 118a of third stator 106a has an opposite magnetization direction relative to first permanent magnet 118a of first stator 104 that is the closest permanent magnet of first stator 104.

Figure 12:
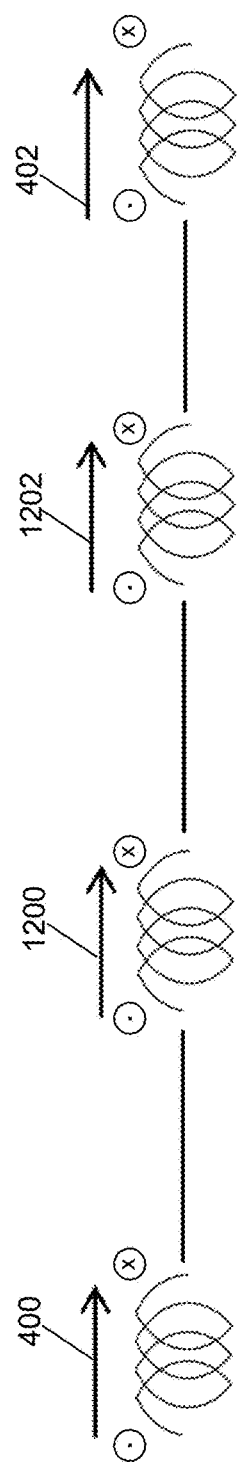
FIG. 12 depicts a series winding connectivity diagram between windings of the first stator of FIG. 2 and the second stator of FIG. 11 in accordance with an illustrative embodiment.

In an illustrative embodiment, the first windings of first stator 104 and the first windings of third stator 106a are tied together in series at a point. For example, with reference to FIG. 12, first winding 400, a fifth winding 1200, a sixth winding 1202, and second winding 402 are tied together. First winding 400 may be the first phase positive winding of first stator 104, second winding 402 may be the first phase negative winding of first stator 104, fifth winding 1200 may be the first phase positive winding of third stator 106a, and sixth winding 1202 may be the first phase negative winding of third stator 106a. First winding 400, fifth winding 1200, sixth winding 1202, and second winding 402 are connected in series. Additional windings (not shown) may be similarly mounted in the first plurality of slots 114 of first stator 104 and the first plurality of slots 114 of third stator 106a, may be connected in a similar manner, and joined in a "Y" configuration for any additional phases as understood by a person of skill in the art. The windings are wound about first stator 104 and about second stator 106 to form a number of poles between a set of terminals (not shown).

A single winding may be wound around first stator 104 and third stator 106a without end turns. Again, a first flux linkage curve in the series connected first winding 400 and fifth winding 1200 is a mirror image of a second flux linkage curve in the series connected sixth winding 1202, and second winding 402. If the flux linkage produced by winding first winding 400 and fifth winding 1200 is $\lambda_1(\theta)$, and the flux linkage produced by sixth winding 1202, and second winding 402 is $\lambda_2(\theta)$, the relationship between the flux linkages is $\lambda_2(\theta)=\lambda_1(-\theta)$, where $0 \le \theta < 360°$. As a result, the waveforms of $\lambda_1(\theta)$ and of $\lambda_2(\theta)$ are symmetrical about the y-axis (or $\theta=0$) axis, where $\theta$ is the rotor position in electric degrees.

The compensation of flux linkage is achieved by changing the polarity of the first plurality of permanent magnets 118 in third stator 106a with respect to first stator 104. Referring again to FIG. 10, a spacer 1002 may be mounted between first stator 104 and third stator 106a to maintain a gap between the two stators to prevent the permanent magnets from shorting the magnetic flux path axially from one stator to the other. The axial flux leakage created by this short magnetic flux path may slightly reduce the main flux and reduce the torque generated by second FSPM 1000, but the overall performance of second FSPM 1000 is very close to that of FSPM 100.

Figure 13:
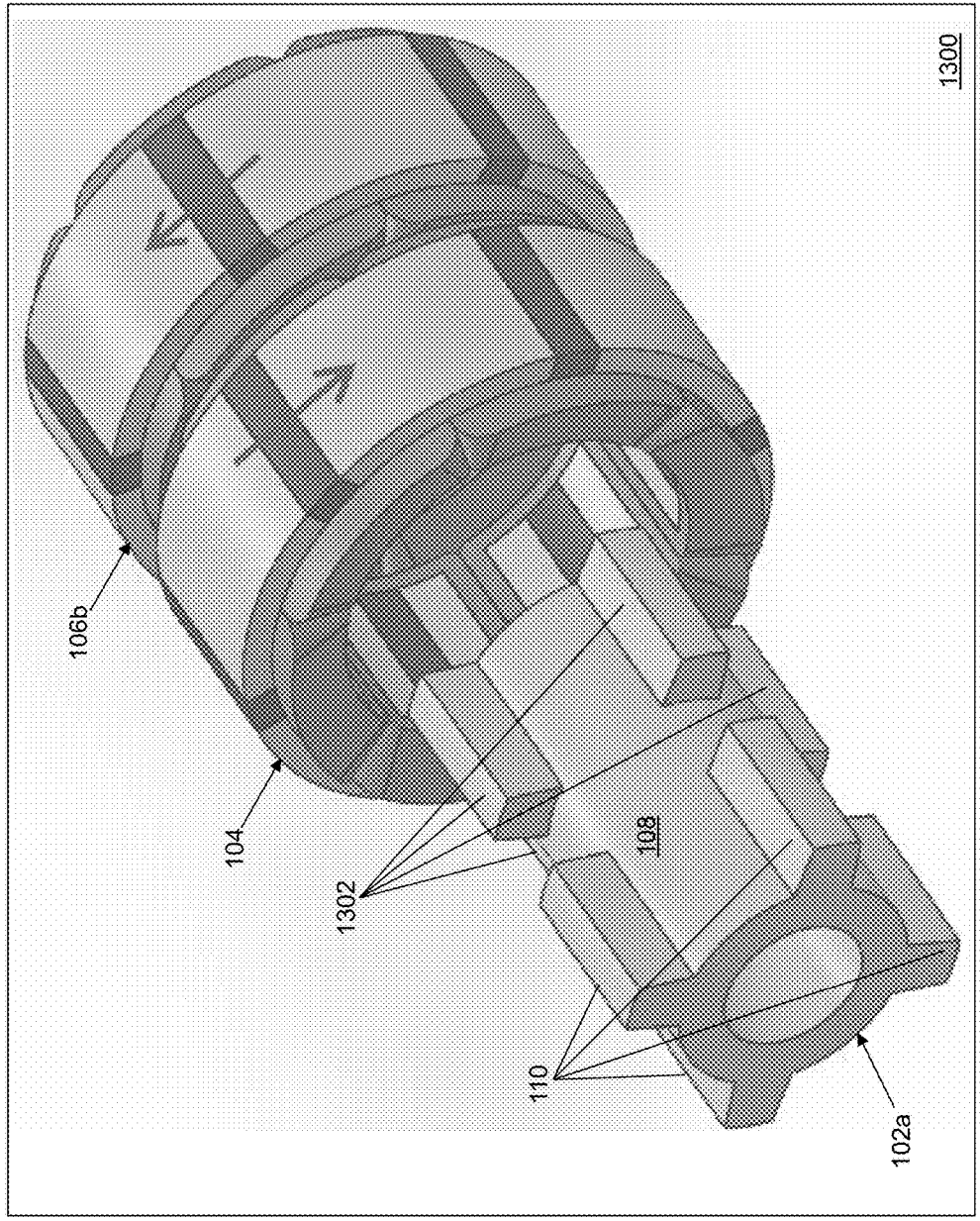
FIG. 13 depicts a perspective view of a third FSPM in accordance with an illustrative embodiment.

Referring to FIG. 13, a front perspective view of a third FSPM 1300 is shown in accordance with a third illustrative embodiment. Third FSPM 1300 may include a second rotor 102a, first stator 104, and a fourth stator 106b. In the illustrative embodiment, third FSPM 1300 is a three-phase machine that can be configured as a generator or as a motor as understood by a person of skill in the art. In alternative embodiments, third FSPM 1300 can be configured to support a fewer or a greater number of phases.

Second rotor 102a may include rotor core 108, the first plurality of poles 110, and a third plurality of poles 1302. Second rotor 102a is similar to rotor 102 except that the third plurality of poles 1302 are axially aligned with the first plurality of poles 110 instead of being rotated 45 degrees with respect to the first plurality of poles 110.

Figure 14:
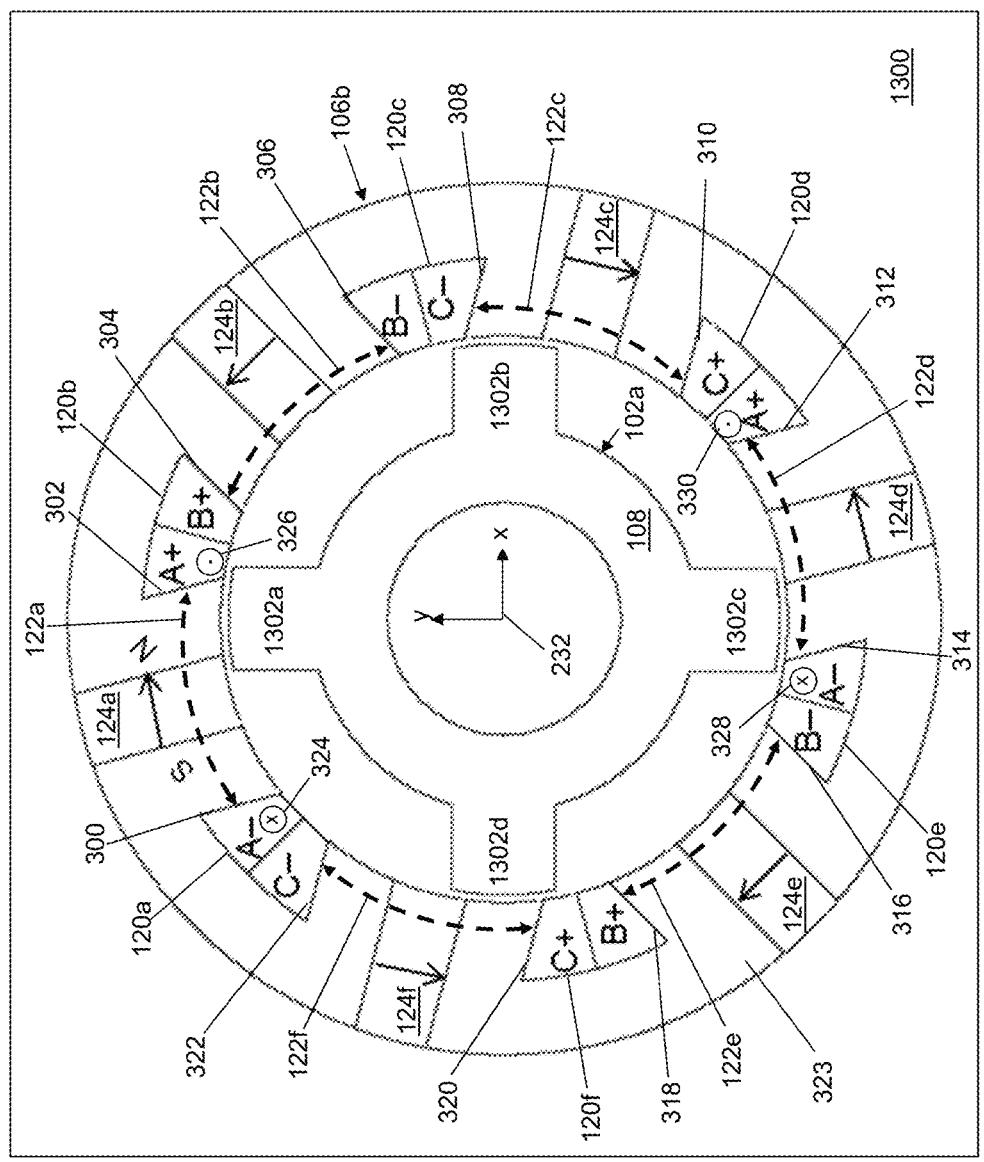
FIG. 14 depicts a front view of a second stator of the third FSPM of FIG. 13 in accordance with an illustrative embodiment.

Referring to FIG. 14, a back cross-sectional view of third FSPM 1300 is shown in accordance with an illustrative embodiment. The third plurality of poles 1302 may include a first pole 1302a, a second pole 1302b, a third pole 1302c, and a fourth pole 1302d mounted to extend from rotor core 108 at equal angles. Relative to x-y axes 232, first pole 1302a is positioned at 90 degrees, second pole 1302b is positioned at 0 degrees, third pole 1302c is positioned at −90 degrees, and fourth pole 1302d is positioned at 180 degrees in axial alignment with the first plurality of poles 110.

In the illustrative embodiment of FIG. 14, fourth stator 106b may be identical to second stator 106 except that fourth stator 106b is rotated −45 degrees relative to second stator 106 when mounted in alignment with first stator 104. As a result, first slot 120a of fourth stator 106b is rotated −45 degrees relative to first slot 120a of second stator 106, second slot 120b of fourth stator 106b is rotated −45 degrees relative to second slot 120b of second stator 106, and so on.

Figure 15:
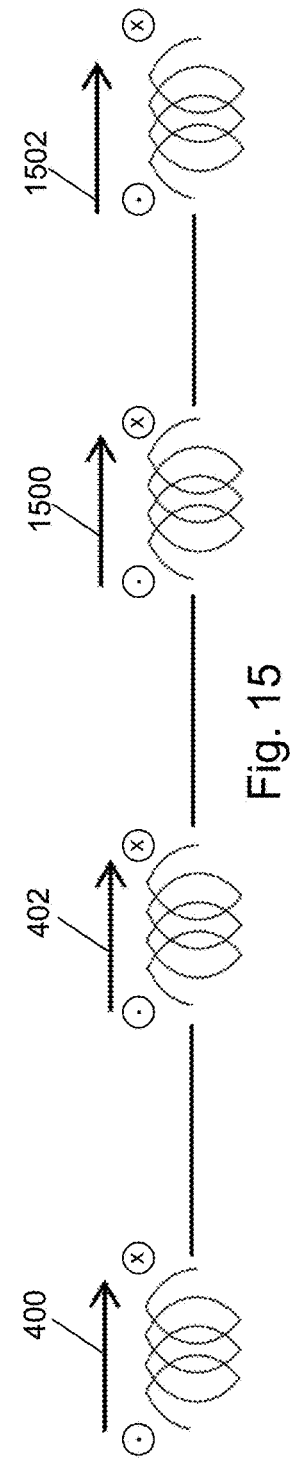
FIG. 15 depicts a series winding connectivity diagram between windings of the first stator of FIG. 2 and the second stator of FIG. 14 in accordance with an illustrative embodiment.

In an illustrative embodiment, the first windings of first stator 104 and the second windings of fourth stator 106b are tied together in series at a point. For example, with reference to FIG. 15, first winding 400, second winding 402, a seventh winding 1500, and an eighth winding 1502 are tied together. First winding 400 may be the first phase positive winding of first stator 104, second winding 402 may be the first phase negative winding of first stator 104, seventh winding 1500 may be the first phase positive winding of fourth stator 106b, and eighth winding 1502 may be the first phase negative winding of fourth stator 106b. First winding 400, second winding 402, seventh winding 1500, and eighth winding 1502 are connected in series. Additional windings (not shown) may be similarly mounted in the first plurality of slots 114 of first stator 104 and the second plurality of slots 120 of fourth stator 106b, may be connected in a similar manner, and joined in a "Y" configuration for any additional phases as understood by a person of skill in the art. The windings are wound about first stator 104 and about second stator 106 to form a number of poles between a set of terminals (not shown).

A single winding may be wound around first stator 104 and fourth stator 106b. Again, a first flux linkage curve in the series connected first winding 400 and second winding 402 is a mirror image of a second flux linkage curve in the series connected seventh winding 1500 and eighth winding 1502. If the flux linkage produced by winding first winding 400 and second winding 402 is $\lambda_1(\theta)$, and the flux linkage produced by seventh winding 1500 and eighth winding 1502 is $\lambda_2(\theta)$, the relationship between the flux linkages is $\lambda_2(\theta)=\lambda_1(-\theta)$, where $0 \le \theta < 360°$. As a result, the waveforms of $\lambda_1(\theta)$ and of $\lambda_2(\theta)$ are symmetrical about the y-axis (or $\theta=0$) axis, where $\theta$ is the rotor position in electric degrees.

The compensation of flux linkage is achieved by rotating fourth stator 106b relative to the third plurality of poles 1302. The overall performance of third FSPM 1300 is very close to that of FSPM 100. However, the flux linkage paths produced by the permanent magnets are slightly different. Some of the flux produced by the N-type (or S-type) permanent magnets in one stator goes in the axial direction across the gap between first stator 104 and fourth stator 106b forming a closed shorted-circuited loop with the S-type magnet (or N-type) magnet in the other stator. This flux is regarded as leakage flux that may reduce the main flux which contributes to the production of torque. As a result, third FSPM 1300 may produce slightly less torque than FSPM 100.

FSPM 100, second FSPM 1000, and third FSPM 1300 use two sets of stator windings to compensate unsymmetrical flux linkage waveforms and to synthesize a quasi-sinusoidal flux linkage waveform so that the three phase back-EMF waveforms are balanced without even order harmonics. FSPM 100, second FSPM 1000, and third FSPM 1300 can be driven at high-speed using a traditional inverter drive with less fundamental frequency to reduce the iron loss. In comparison to a typical 12 stator slots and 10 rotor poles FSPM, FSPM 100, second FSPM 1000, and third FSPM 1300 have been shown to achieve a 60% reduction in fundamental frequency. For example, while a fundamental frequency of 2,500 hertz (Hz) is needed for a typical 12 stator slots and 10 rotor poles FSPM, FSPM 100, second FSPM 1000, and third FSPM 1300 have been shown to only need 1000 Hz.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, using "and" or "or" is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. An electrical machine comprising:
   a rotor comprising
      a rotor core forming a cylinder having a circular cross section;
      a first plurality of poles mounted to extend radially from the circular cross section of the rotor core and along a surface of the rotor core; and
      a second plurality of poles mounted to extend radially from the circular cross section of the rotor core and laterally along the surface of the cylinder of the rotor core,
      wherein the first plurality of poles and the second plurality of poles do not overlap radially in a plane of the circular cross section of the rotor core;
   a first stator comprising
      a first stator core;
      a first plurality of teeth mounted to extend from the first stator core to form a first plurality of slots; and
      a first plurality of permanent magnets mounted as first spokes within the first plurality of teeth,
      wherein a slot of the first plurality of slots is positioned between a pair of the first plurality of teeth, and
      further wherein the first stator is mounted radially relative to a first side of the rotor separated by a first air gap between the first plurality of poles and the first plurality of teeth;
   a second stator comprising
      a second stator core;
      a second plurality of teeth mounted to extend from the second stator core to form a second plurality of slots; and
      a second plurality of permanent magnets mounted as second spokes within the second plurality of teeth,
      wherein a slot of the second plurality of slots is positioned between a pair of the second plurality of teeth, and
      further wherein the second stator is mounted radially relative to the first side of the rotor separated by a second air gap between the second plurality of poles and the second plurality of teeth;
   a first stator winding for a first phase wound about a first tooth of the first plurality of teeth;
   a second stator winding for the first phase wound about a second tooth of the first plurality of teeth;
   a third stator winding for the first phase wound about a first tooth of the second plurality of teeth; and
   a fourth stator winding for the first phase wound about a second tooth of the second plurality of teeth;
   wherein the first stator winding, the second stator winding, the third stator winding, and the fourth stator winding are connected in series, and further wherein a first flux linkage in a first pair of the series connected windings is a mirror image of a second flux linkage in a second pair of the series connected windings, wherein the second pair of the series connected windings is connected in series with the first pair of the series connected windings, and wherein $\lambda 2(\theta)=\lambda 1(-\theta)$, wherein $\lambda 1$ is the first flux linkage, $\lambda 2$ is the second flux linkage, and $0 \leq \theta \leq 360°$, and $\theta$ is a rotor position in electric degrees.

2. The electrical machine of claim 1, wherein a number of slots of the first plurality of slots equals a number of slots of the second plurality of slots.

3. The electrical machine of claim 2, wherein a number of poles of the first plurality of poles equals a number of poles of the second plurality of poles.

4. The electrical machine of claim 3, wherein the number of slots is greater than the number of poles.

5. The electrical machine of claim 4, wherein the number of slots equals six, and the number of poles equals four.

6. The electrical machine of claim 2, wherein the first plurality of permanent magnets are mounted as first spokes within each of the first plurality of teeth, and the second plurality of permanent magnets are mounted as second spokes within each of the second plurality of teeth.

7. The electrical machine of claim 1, further comprising:
   a first stator winding for a second phase wound about a third tooth of the first plurality of teeth;
   a second stator winding for the second phase wound about a fourth tooth of the first plurality of teeth;
   a third stator winding for the second phase wound about a third tooth of the second plurality of teeth; and
   a fourth stator winding for the second phase wound about a fourth tooth of the second plurality of teeth;
   wherein the first stator winding, the second stator winding, the third stator winding, and the fourth stator winding for the second phase are connected in series, and
   further wherein a first flux linkage in a first pair of the series connected windings for the second phase is a mirror image of a second flux linkage in a second pair of the series connected windings for the second phase, wherein the second pair of the series connected windings for the second phase is connected in series with the first pair of the series connected windings for the second phase.

8. The electrical machine of claim 1, wherein the second plurality of poles is rotated about the circular cross section of the rotor core relative to the first plurality of poles.

9. The electrical machine of claim 8, wherein the second plurality of poles are rotated 45 degrees relative to the first plurality of poles.

10. The electrical machine of claim 8, wherein successive pairs of the first plurality of permanent magnets have opposite magnetization directions, wherein successive pairs of the second plurality of permanent magnets have opposite magnetization directions, wherein a permanent magnet of the second plurality of permanent magnets that is closest to a permanent magnet of the first plurality of permanent magnets has an opposite magnetization direction relative to the closest permanent magnet of the first plurality of permanent magnets.

11. The electrical machine of claim 10, wherein the first tooth of the first plurality of teeth is axially aligned with the first tooth of the second plurality of teeth relative to a surface of the cylinder of the rotor core, and the first stator winding and the third stator winding are wound in a same direction.

12. The electrical machine of claim 8, wherein successive pairs of the first plurality of permanent magnets have opposite magnetization directions, wherein successive pairs of the second plurality of permanent magnets have opposite magnetization directions, wherein a permanent magnet of the second plurality of permanent magnets that is closest to a permanent magnet of the first plurality of permanent magnets has a same magnetization direction relative to the closest permanent magnet of the first plurality of permanent magnets.

13. The electrical machine of claim 12, wherein the first tooth of the first plurality of teeth is axially aligned with the first tooth of the second plurality of teeth relative to a surface of the cylinder of the rotor core, and the first stator winding and the third stator winding are wound in an opposite direction.

14. The electrical machine of claim 1, wherein the first pair of series connected windings is the first stator winding and the second stator winding and the second pair of series connected windings is the third stator winding and the fourth stator winding.

15. The electrical machine of claim 1, wherein the first pair of series connected windings is the first stator winding and the third stator winding and the second pair of series connected windings is the fourth stator winding and the second stator winding.

16. The electrical machine of claim 15, wherein the second plurality of poles are axially aligned with the first plurality of poles relative to the circular cross section of the rotor core.

17. The electrical machine of claim 16, wherein successive pairs of the first plurality of permanent magnets have opposite magnetization directions, wherein successive pairs of the second plurality of permanent magnets have opposite magnetization directions, wherein a permanent magnet of the second plurality of permanent magnets that is closest to a permanent magnet of the first plurality of permanent magnets has an opposite magnetization direction relative to the closest permanent magnet of the first plurality of permanent magnets.

18. The electrical machine of claim 17, wherein the first tooth of the second plurality of teeth is rotated 45 degrees relative to the first tooth of the first plurality of teeth in an axial direction along a surface of the cylinder of the rotor core.

* * * * *